G. GARRETSON.
DRILL CHUCK.
APPLICATION FILED SEPT. 4, 1908.

923,041.

Patented May 25, 1909.

Inventor
George Garretson.

Witnesses
F. C. Gibson.
Geo. Ackman Jr.

By Victor J. Evans
Attorney

UNITED STATES PATENT OFFICE.

GEORGE GARRETSON, OF SAN DIEGO, CALIFORNIA.

DRILL-CHUCK.

No. 923,041.  Specification of Letters Patent.  Patented May 25, 1909.

Application filed September 4, 1908. Serial No. 451,682.

*To all whom it may concern:*

Be it known that I, GEORGE GARRETSON, a citizen of the United States, residing at San Diego, in the county of San Diego and State of California, have invented new and useful Improvements in Drill-Chucks, of which the following is a specification.

This invention is an improved drill chuck especially adapted for use in connection with the boring machine for which an application for Letters Patent of the United States has been made by Jefferson Kindleberger and George Garretson, but which chucks may also be used on other machines and in other connections and the said invention consists in the construction, combination and arrangement of devices hereinafter described and claimed.

Figure 1:
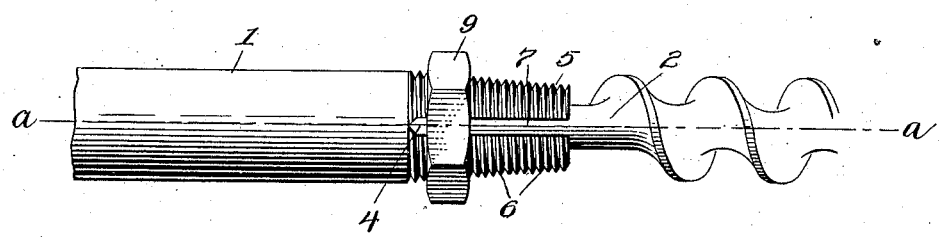
Figure 2:
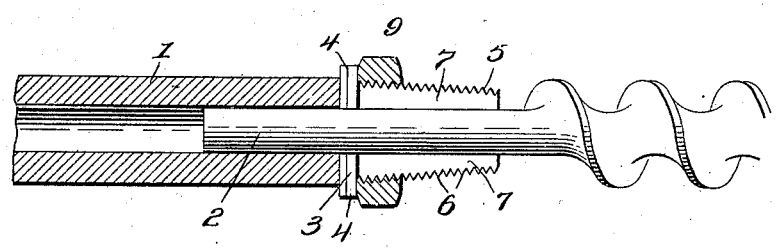
Figure 3:
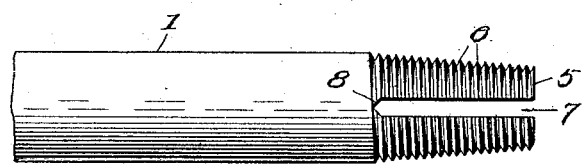

In the accompanying drawings, Figure 1 is an elevation of a chuck or shaft connection constructed in accordance with this invention. Fig. 2 is a longitudinal sectional view of the same taken on the plane indicated by the line $a$—$a$ of Fig. 1. Fig. 3 is a detail elevation of the chuck sleeve or body.

In accordance with this invention, I provide a cylindrical chuck sleeve or body 1 which is preferably made of steel and which is adapted to be secured to a revolving member of a boring machine or device of any description and the interior diameter of which is of suitable size to enable the inner end of a boring bit 2 to be placed therein. The boring bit may be of suitable construction for boring metal or wood and I do not desire to limit myself in this particular. Said bit is provided at a suitable distance from its inner end with a transversely disposed pin 3 which provides studs 4 that project from opposite sides of the bit. The sleeve or body 1 is provided at its outer end with a tapered and reduced portion 5 which is externally screw threaded as at 6. Also at said end of the sleeve or body are longitudinal slots 7 open at their outer ends and which are of any suitable length and of which any suitable number may be employed, said slots serving to divide the outer end of the said sleeve or body into segmental jaw portions. The inner end of each slot is wedge shaped as at 8. When the drill is placed with its inner end in said sleeve or body, the studs 4 enter the slot 7 and coact therewith to cause the bit to rotate with said sleeve or body. In order to secure the bit in and to the sleeve or body, I also provide a nut 9 which is screwed on the reduced tapered threaded portion 6 of the sleeve or body, serves to clamp the segmental jaws on the bit and also serves to force the studs 4 into the wedge shaped inner ends of the slots 7 so that the said studs are rigidly held in said slots and the bit is firmly gripped by the segment jaws and all lost motion between the bit and the tubular sleeve or body is entirely prevented.

Having thus described the invention, what is claimed as new is:—

1. In a device of the class described, the combination with a bit having studs projecting radially therefrom, a tubular body having slots at one end to receive said studs and forming segment jaws, said segment jaws being externally threaded and a nut screwed on said segment jaws to clamp them on said bit and to force the said studs into the inner ends of said slots.

2. In a device of the class described, the combination with a bit having studs projecting radially therefrom, a tubular body having slots at one end to receive said studs and forming segment jaws, said slots having wedge-shaped inner ends, said segment jaws being externally threaded and a nut screwed on said segment jaws to clamp them on said bit and to force the said studs into the wedge-shaped inner ends of said slots.

In testimony whereof I affix my signature in presence of two witnesses.

GEORGE GARRETSON.

Witnesses:
 FRED ESSEIN,
 JNO. P. BURT.